United States Patent

Ruth

[15] 3,676,861

[45] July 11, 1972

[54] MULTIPLE MASK REGISTERS FOR SERVICING INTERRUPTS IN A MULTIPROCESSOR SYSTEM

[72] Inventor: Richard L. Ruth, Paradise Valley, Ariz.

[73] Assignee: Honeywell Information Systems Inc., Waltham, Mass.

[22] Filed: Dec. 30, 1970

[21] Appl. No.: 102,771

[52] U.S. Cl. ....................340/172.5

[51] Int. Cl. ....................G06f 13/00, G06f 15/16

[58] Field of Search ....................340/172.5; 235/157

[56] References Cited

UNITED STATES PATENTS

| | | | |
|---|---|---|---|
| 3,479,649 | 11/1969 | Bahrs et al. | 340/172.5 |
| 3,421,150 | 1/1969 | Quosig et al. | 340/172.5 |
| 3,374,465 | 3/1968 | Richmond et al. | 340/172.5 |
| 3,500,329 | 3/1970 | Couleur et al. | 340/172.5 |
| 3,523,283 | 8/1970 | Cohen et al | 340/172.5 |
| 3,540,000 | 11/1970 | Bencher | 340/172.5 |

*Primary Examiner*—Paul J. Henon
*Assistant Examiner*—Mark Edward Nusbaum
*Attorney*—Fred Jacob and Edward W. Hughes

[57] ABSTRACT

Multiple mask registers located in a system communication controller enable each processor in a multiprocessing system to be a control processor and thereby select and execute interrupts on a priority basis. An executive program which supervises a processor loads its mask register with information according to the priority of the operation to be performed by the processor to control the answering of communication from itself and other modules of the processing system. The system controller includes an interrupt cells register associated with all of the mask registers. The interrupt cells store the existence of an interrupt request and are arranged in a predetermined priority which is altered by each mask register for each control processor.

10 Claims, 11 Drawing Figures

INVENTOR
RICHARD L. RUTH
BY
James A. Gershon
ATTORNEY

Patented July 11, 1972 3,676,861

10 Sheets-Sheet 7

MULTIPLE MASK REGISTERS FOR SERVICING INTERRUPTS IN A MULTIPROCESSOR SYSTEM

BACKGROUND OF THE INVENTION

This invention relates generally to an information processing system and more particularly to an interrupt priority means located in a central system controller for providing communication control by each processor in a multiprocessing system.

In prior art multiprocessor information processing systems one processor and only one processor could be designated a control processor. The control processor controls the servicing of the interrupts by the modules of the information processing system.

However, in many cases each processor in a multiprocessing system is executing a different program and therefore one processor could be executing a high level program and another a low level program and an interrupt is requested. If the first processor had been designated the control processor and the request had a lower priority than the high level program, the first processor would continue executing its program until completed before the interrupting program will be executed. It is quite possible that the interrupting program is of a much higher level than the low level program being executed by the second processor. Priority in the prior art devices is determined strictly by the relationship of the interrupting request to the program being executed by the control processor.

Likewise, without a central control of interrupts and masking, each processor must perform its own accepting or rejecting of the task assignment. In the prior art a central interrupt directory is provided but in order to permit a processor to control or inhibit an interrupt, the processor must be contacted, at which time the processor must determine if the priority of the interrupt is high enough to warrant an interruption.

SUMMARY OF THE INVENTION

The problems of the prior art are solved by providing a means of permitting each processor in a multiprocessing system to become a control processor to provide a more efficient servicing of communications requests having a priority greater than the program being executed. The present invention alleviates the problem of priority in interrupting processors in a multiprocessing system by providing a means in a central system controller for masking or disabling the interruption of a processor performing a program that is of a higher level than the program requested by the interrupting module and permitting the interruption of a processor executing a program which is of a lower level than the program requested by the interrupting module.

A mask register is provided in a system controller that stores the priority rating of the program being processed by a control module. Another register stores the interrupt requests for processing time or access to a module in the system. The mask register selectively prevents the interrupt from being serviced by the control module associated with the mask register by disabling a priority select interrupt logic circuitry that prevents the transmission of the interrupt signals to the control module. At the completion of the program by the control module the control module requests the highest priority interrupt signal stored in the interrupt register. The interrupt signals are sent to the interrupt registers by the modules requesting an interrupt. A priority rating signal set as well as an identification signal are included with the interrupt signal. This priority rating signal places the interrupt signal in a priority tree logic circuitry. The priority tree permits the servicing of interrupts at the highest level first by any of the control modules, thus providing for the servicing of the interrupts by several processors set as control processors rather than having only one processor servicing interrupts.

In a modern multiprocessing or multiprogramming computer system it is necessary to free both the hardware and the software from the burden of checking other components of the system either for completion of or requests for service. To accomplish this, active modules such as input/output controllers which have completed assigned tasks or which require service generate interrupts to the normal flow of instructions in a processor. In a multiprocessor system these interrupts can be generated by processors as well as by input/output devices.

Each system controller according to the present invention has its program interrupt cells connected in a priority sequence. Any interrupt request generated by an active module will enable one of these interrupt cells, depending on which particular interrupt cell the interrupting device has been assigned to use. For each interrupt cell there is a control processor which will respond when that particular interrupt cell has been enabled.

Upon the completion of each instruction in the processor, a check is made for the presence of an interrupt. If no interrupts are present, or if the interrupt inhibit function called a mask function is active, instruction execution continues in a normal sequence. If one or more interrupts are present and not masked or inhibited, the system controller reports the identity of the highest priority cell that is enabled and then resets that interrupt cell. This causes the processor to take its next instruction from a preassigned location that is determined on the basis of the interrupt cell's identity. For each of the interrupt cells, two consecutive locations are provided in the memory store, and the instructions from these locations are normally set up to store machine status and then transfer to the appropriate routine for servicing the interrupt. A word interrupt table, or interrupt vector, is thus required for each system controller in the system. When servicing of the interrupt is completed, the supervisory software dispatches to the highest priority program in its queue.

The system controller of the present invention has several interrupt enabling or mask registers, one for each processor connected to the system controller. Each of the mask registers contains one bit corresponding to each interrupt cell in that system controller. These mask registers can be loaded by a processor connected to a control port and determine which processor is the control processor for each interrupt cell.

The supervisory software servicing a particular interrupt will normally preserve the instruction counter and indicators for the interrupted program. If necessary, the supervisory software can load the mask register with a suitable combination of bits of information to prevent any undesired interrupts. Servicing of the interrupt can then proceed without use of the masking bit. The supervisory software can thus be protected against undesirable interrupts, but can be interrupted in turn by an enabled higher priority interrupt. The supervisory software via the multiple control processors has the flexibility of distributing the execution of various interrupts among the control processors. All mask registers can be interrogated by each control processor via a read command to survey the status of each other control processor and the interrupts requested by such other control processor. Thus a high level priority interrupt of any processor can be serviced by any control processor.

The response to a program interrupt may result in the branching from the program being processed to a predetermined subroutine or perhaps repeat a procedure if an error occurred. However, the system of the present invention provides flexibility by permitting the response to a program signal to be altered by the system prior to receiving the program interrupt. The response to the program interrupt signal may then take the form of a branch from the presently serviced program by any of the several control processors, to an instruction that may be changed in accordance with the executive program by the control processor.

It is, therefore, an object of the present invention to provide a multiprocessor data processing system having a changeable priority awarding means for altering the priority of program interrupt requests.

It is another object of the present invention to provide a multiprocessor data processing system wherein several processors can service interrupt requests on a priority basis.

It is yet another object to provide a data processing system wherein a system controller receives and temporarily stores indications of interrupt requests and wherein several control processors may mask selected ones of the interrupt requests to thereby inhibit acknowledgment of the request by the system controller to any one or all of the control processors.

It is a further object to provide a data processing system wherein the system controller receives and temporarily stores indications of interrupt requests and wherein several processors may control the masking of selected ones of the interrupt requests to permit the interrupt of a program being processed if the interrupt request is of a higher priority and to mask the interrupt request if it is of a lower priority.

It is yet another object to provide an enhanced method of servicing interrupts in a system communication controller under control of several data processors.

These and other objects of the present invention will become apparent to those skilled in the art as the description proceeds.

BRIEF DESCRIPTION OF THE DRAWING

Further features and a more specific description of an illustrated embodiment of the invention are presented hereinafter with reference to the accompanying drawing, wherein.

DESCRIPTION OF THE PREFERRED EMBODIMENT

Figure 1:
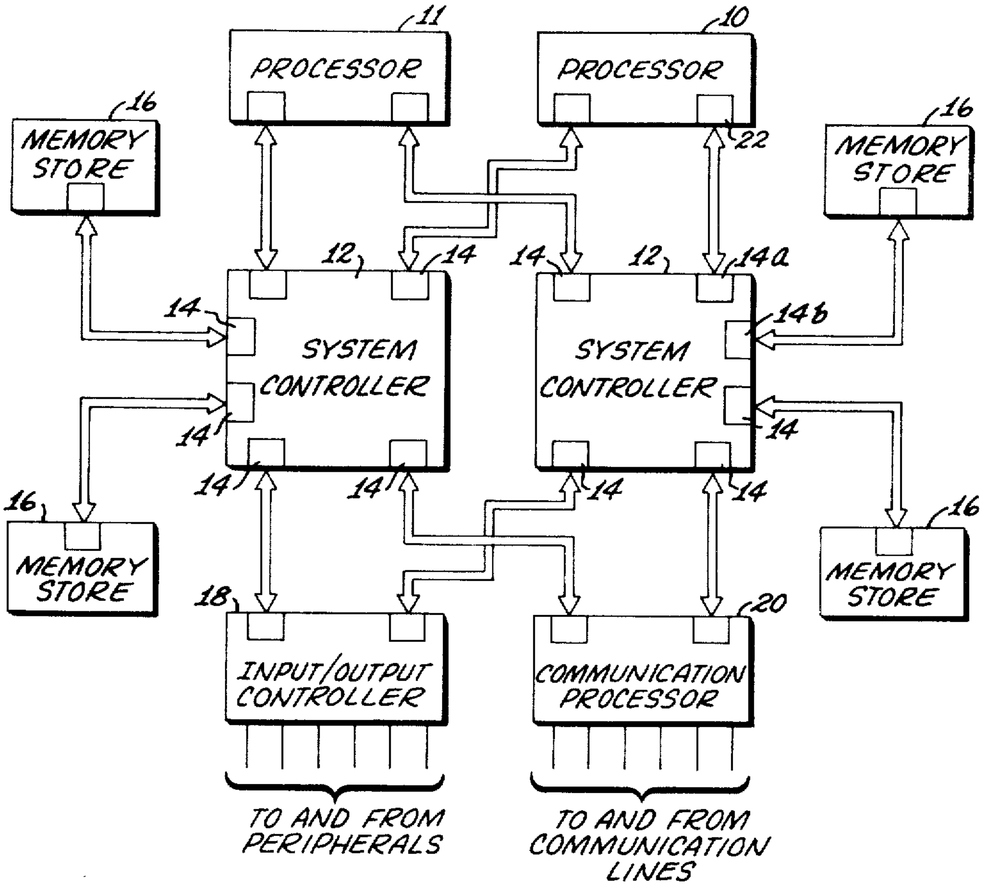
FIG. 1 is a block diagram of a multiprocessor data processing system for use with the embodiments described herein.

In FIG. 1 is shown a multiprocessor data processing system comprising several data processing modules for use with the present invention. Two processors 10 and 11 in the data processing system are connected to a group of system controllers 12, two of which are shown. The system controllers 12, through channels or communicating ports 14, control the communication of the data processing system among the processors 10 and 11, a group of memory storage banks 16, an input/output controller 18, and a communications processor 20. The input/output controller 18 is a coordinator of all input/output operations between the complement of peripheral subsystems such as magnetic drum storage units, disc storage units, and magnetic tape storage units, and each of the plurality of system controllers 12. The communications processor 20 can be a data communication processor that automatically receives and processes information from remote terminals for direct input into the system via the system controllers, and transmits information to these terminals over common-carrier facilities.

Data information transfer into and out of the system controllers 12 and the remaining modules of the data processing system is accomplished via separate ports 14. These ports are under the control of a port select signal which selects and activates a particular port in the system to receive or transmit data information. For instance, if processor 10 desires communication with the memory 16, a port 22 in the processor would be activated to a transmit condition and a port 14*a* in the system controller 12 would be enabled to receive the request. The system controller 12 in turn would activate a port 14*b* to communicate with the memory 16 and, via the port 14*b* and 14*a*, relay the information to the port 22 in the processor 10. Thus, the ports in each of the data processing modules in the system control the communications between the modules. A further explanation of a modular data processing system and especially a system communicating controller for use with the present invention can be obtained by referring to U.S. Pat. No. 3,413,613 issued to Bahrs et al on Nov. 26, 1968. Reference is in particular made to U.S. Pat. No. 3,479,649 issued to Bahrs et al on Nov. 18, 1969 for a discussion of masking program interrupt requests.

Figure 2:
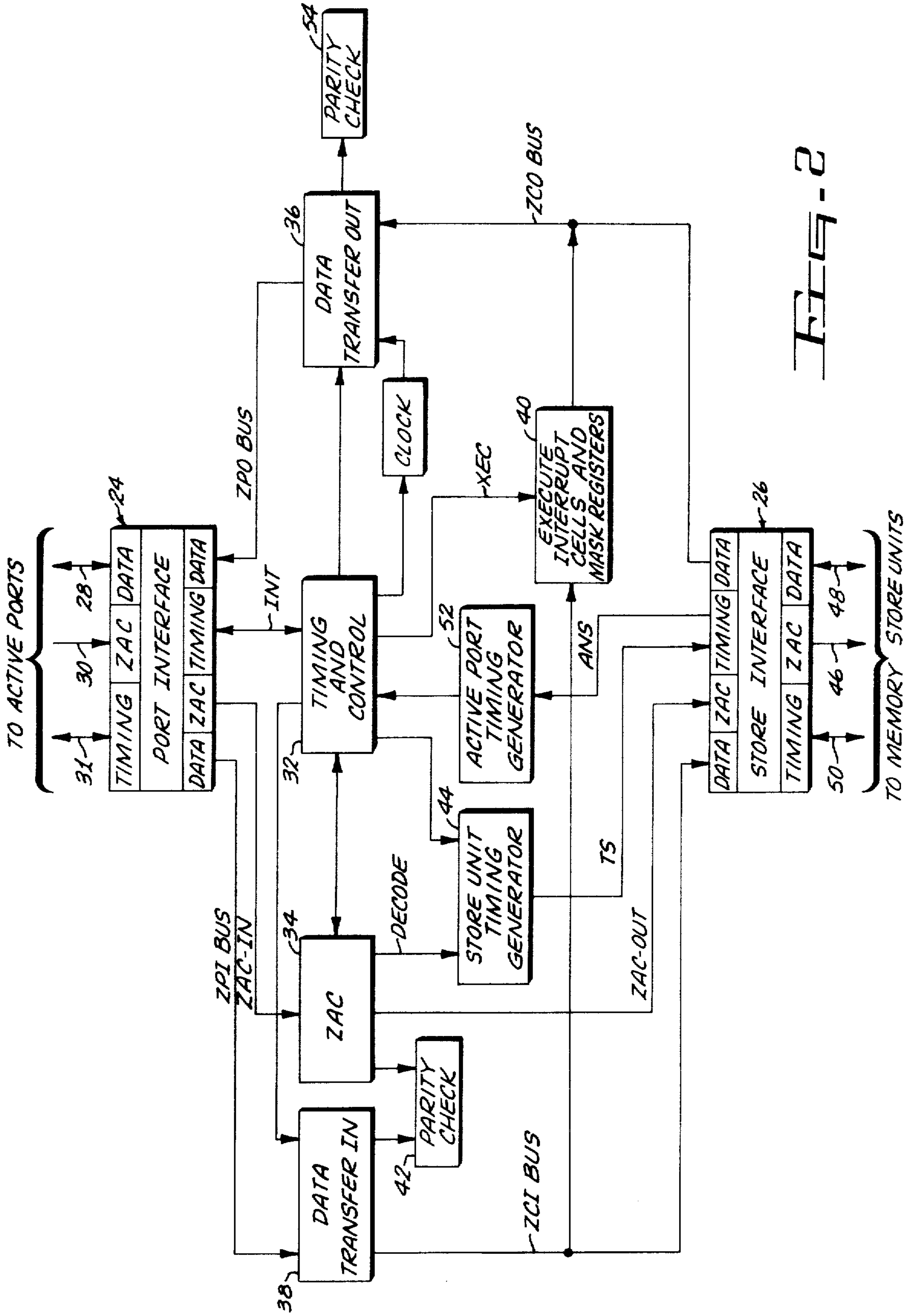
FIG. 2 is a functional block diagram of one system controller for use in the data processing system of FIG. 1.

In FIG. 2 is shown a more detailed functional block diagram of one system controller for use in the data processing system of FIG. 1. The basic function of the system controller is the coordination of the retrieval and storage of data in the high speed store units for the active system modules. In addition to store unit data transactions, the system controller also contains internal registers that are used to control the hardware operation of the total data processing system.

Referring specifically now to FIG. 2, the system controller contains two interfaces designated as a port interface 24 and a store interface 26. The port interface 24 directs the data to and from the active ports and acts as the communications distribution center for the entire data processing system. The store interface 26 is the communications link between the system controller and the attached store units (see FIG. 1).

The port interface 24 is the active module interface to and from the system controller ports. The active modules are the processors 10 and 11, the input/output controller 18, and the communications processor 20 of FIG. 1 as an example. The basic function of the port interface 24 is to provide the hardware and logic necessary to connect the active modules to the system controller.

The data word at the port interface 24 is 72 bits transferred in parallel plus a parity bit associated with bits 00–35 and a parity bit associated with bits 36–71. The parity check in the system controller of the present invention is for odd bit parity and therefore a correct information is an odd number of bits including the parity bit. Bit 00 of the data is the most significant bit and bit 71 is the least significant bit. Transmission of the 72 data bits between the active ports and the system controller is accomplished via bidirectional lines 28, that is, the data to and from the active modules is transmitted on the same wire. The two parity bits are unidirectional thus requiring two unique lines from the active module and two unique lines to the active module.

The system controller is signaled to start a cycle with an asynchronous interrupt signal designated $INT. Upon the receipt of an interrupt signal from an active module, the system controller will perform a priority check to assure that the requesting module is the highest priority module currently requesting a cycle.

The initial decision made by the system controller upon the receipt of an interrupt signal is to establish that the store unit to which the cycle is to be directed is available, that is, the store unit is not busy with a cycle that is in process. The system controller will normally have two store units attached and will utilize four of the requesting active module address bits called address look ahead bits to determine which of the two store units the cycle should be directed.

Once it has been established by the system controller that the store unit requested by the active module is not busy and the port priority is the highest currently requesting a cycle, the system controller proceeds to process the active module request. The next decision by the system controller is the determination of what type of cycle the active module has designated. The system controller gates the data from line 28 and the zone, address and command signals designated ZAC from line 30 into its internal bus lines. As shown in FIG. 2, the data is directed onto a ZPI bus line, the zone, address, and command signals are gated onto ZAC-IN lines, and the timing and control signals are directed onto lines designated INT.

The timing and control signals are directed from lines 31 by the port interface 24 to the INT lines. The timing and control signals include the necessary interface controls to start and complete a system controller cycle plus various other noncycle oriented controls. The timing and control signals are directed to a timing and control logic 32 which controls a ZAC logic 34 to control the decoding of the zone, address and command signals. The zone, address, and command signals are transferred to the store interface unit 26 via ZAC-OUT lines. The timing and control logic 32 also is directed to a data transfer out logic 36 to control the data signals transferred from the store unit to the active ports. The timing and control logic 32 also controls a data transfer in logic 38 to control the input data from the port interface 24 via the ZPI bus and the transfer of the data on a ZCI bus to the store interface 26 for usage in the storage units. In addition to the normal cycle controls, there are lines associated with internal system controller register cycles. Thus the timing and control logic 32 also controls the setting and resetting of execute interrupt cell and mask registers shown as block 40 via the line designated XEC. The execute interrupt cells and the mask registers 40 are controls utilized for intercommunication between active modules connected to the same system controller. The execute interrupt cells and the mask registers 40 form the heart of the present invention and will be discussed in more detail later after the general discussion of the system controller is completed.

Continuing with FIG. 2, the data is directed through the data transfer in logic 38 enroute to the appropriate store unit or internal system controller register. Odd parity is checked in a parity check logic 42 and if an error is detected, a flag will be set for use later in the cycle. The ZAC lines are routed to the ZAC control logic 34 where the command lines are decoded to determine the type cycle requested by the active module. Odd parity is also checked in the parity check logic 42 on the ZAC signals and a flag will be set if an error is detected. The active module will be notified that the requested cycle is being processed by a processor input control signal designated $PIN.

Prior to the determination of the type of cycle the active module has requested by the decode of the command lines, the selected store unit cycle is started by a start store pulse designated $TS which is transmitted to the store unit. This is performed because the system controller performs a store unit cycle for every active module request and the store unit always must read the specified core location prior to any alteration. Thus it is not a requirement in this point of the cycle that either the system controller or the store unit be aware of what type of cycle is in progress.

After the system controller has started the selected store unit with the $TS pulse and the command lines have been decoded, the decision is made as to what type of cycle is to be performed. The type cycle may be one of the four allowable store unit cycles or one of the internal system controller register cycles. If it is a store unit cycle, the appropriate command strobe signal is issued to the store unit thereby signaling it to perform the specified action called for by these control lines. If it is an internal system controller register command, the appropriate internal command strobe signal is issued within the system controller and a read-restore command designated $RRS is sent to the store unit. On internal system controller commands, the store unit is directed to perform the read-restore cycle. The system controller will utilize the response timing signals from the word obtained from the store unit but will ignore the data information in the word. All of the command strobe signals, both for the internal system controller cycle and the store unit cycles are registered in the flip flops for use later in the cycle.

The timing of the system controller cycle is divided into two parts. In the first half of the cycle, the system controller performs the functions of: the selection of the store unit with the address look ahead bits, the determination of port priority, the gating into the system controller of the data and the zone, address and command signals from the requesting port, the issuance of the start pulse $TS to the store unit, the decoding of the command lines, the issuing of the command strobe signals, and the registering of the command strobe signals. Once the first half of the cycle has been completed, the system controller is free to start another cycle to the second store unit if an active module has a request to that store unit as designated by a part of the command word called the address look ahead bits. The registering of the command strobes signals and other appropriate control signals allows the system controller to completely divorce the first half cycle from the last half. The last half of the cycle is asynchronous to the first half and is triggered upon the receipt by the system controller of a store unit response pulse, answer strobe pulse $ANS. The answer strobe pulse from the store unit is a function of the access time of the store unit. Because the system controller time-shares data buses, the two attached store units must have the same access time.

The answer strobe pulse $ANS from the store unit signals the system controller to start the last half of the cycle in anticipation of the data being available from the core at a fixed time following the answer strobe pulse $ANS. The system controller will set up the necessary data paths as determined by the controls registered during the first half cycle. If the cycle was an internal system controller register cycle, the appropriate internal controls are enabled and the requesting active module will be given the designated response. If the cycle was a store unit cycle, the controls are enabled to allow the store unit information to be passed on to the requesting active module. It should be apparent that the timing for both internal system controller register cycles and store unit cycles are identical because the response timing from the store unit is utilized by both to trigger the last half of the system controller cycle timing. Once the data requested by the active module is available at the port interface 24, the system controller will issue a data available $DA pulse to the requesting active module indicating that the data is stable at the active port interface.

The store unit also issues an end of cycle $EOC pulse. The end of cycle pulse is used by the system controller to establish that another cycle may be started to that unit. The end of cycle pulse is issued at a specific time such that the system controller can cycle the store units at their maximum cycle capability. At the conclusion of the system controller cycle, the illegal action code from the store units and within the system controller are examined, encoded, and passed on to the requesting active module. The illegal action code is encoded such that if more than one illegal action occurred on a cycle, only the highest priority illegal action is passed on to the active module.

Still referring to FIG. 2, the store interface 26 is the system controller interface to and from the ports connected to the memory store units. The store interface 26 can accommodate two store units (see FIG. 1). The transfer of the data information on lines 48 and the zone, address and command signals on lines 46 between the system controller and the store units is similar to the transfer of this information between the active modules and the system controller. The store interface 26 accepts the data information via the ZCI bus and transfers the data to the memory store unit on lines 48. The zone, address and command ZAC signals are transferred to the store interface 26 by the ZAC-OUT line and the store interface 26 transmits the ZAC signals to the store units. The timing signals to the store units are taken from a store unit timing generator 44 via lines designated TS and through the store interface via lines 50 to the memory store units. The store unit timing generator 44 takes the decoded ZAC signals from the ZAC logic 34 under control of the timing and control logic 32.

The data lines 48 from the store interface to the store units are bidirectional lines. The timing pulses from the store unit are transmitted into the system controller via the store interface 26 and to an active port timing generator 52 via lines designated ANS. The timing pulses from the active port timing generator 52 are transmitted to the timing control logic 32. The data is transmitted from the store units via lines 48 and from the store interface 26 by a ZCO bus. The ZCO bus transmits the data to the data transfer out logic 36 where a parity check is performed on the data in a parity check logic 54. The data is then transmitted to the active ports via a ZPO bus and the port interface 24 under control of the timing and control logic 32.

The system controller contains internal registers, the execute interrupt cells register and the mask register 40, that are used by the total data processing system in coordinating intermodular communication. The timing and control logic 32 associated with setting and reading these registers is very similar to that required in writing to and reading from the store units. The difference within the system controller is that the data is gated to and from the designated register on internal register commands rather than being directed to and from the store units. An internal register cycle will also force a read-restore cycle to the store unit and the system controller will utilize the response from the store unit to generate the late cycle timing and control. The resultant timing of the port interface 24 is identical for both the internal register cycles and the store unit cycles.

The requesting active module must furnish an address field that will select the lower addressed store unit when the cycle is to be an internal register cycle. This is required to prevent the setting and reading of an internal register by two active modules at the same time when the system controller is fully overlapped. In the overlapped condition which is when one active module has a cycle to one store unit and another active module has a cycle to a second store unit, the system controller could be setting the register at the same time it is reading the register because of the independency of the early and late cycle timing. Therefore an active module attempting to read or set an internal register must present an address field that will direct the read-store cycle to the lower store. Failure to do this will result in an illegal action pulse.

The execute interrupt cells of the execute interrupt cell and mask register logic 40 are the communication link between the input/output modules and the processors. The system controller of the present invention includes 32 execute interrupt cells which comprise the 32 bit interrupt register.

The execute interrupt register is segregated into two halves with the upper half including cells 00 through 15 and the lower half including cells 16 through 31. Cell 00 is the highest priority interrupt cell and cell 31 is the lowest priority cell. To set a cell or cells, the active module must initiate a system controller cycle with an interrupt pulse, provide an address field that will select the lower addressable store unit, and set the command lines with a specific code. The data field presented at the port interface by the active module must be formatted such that bit 35 being a "0" or a "1" will designate whether the "upper" or "lower" cell field respectively will be selected. Further, bits 00 through 15 upper data field will designate which cell or cells are to be set. For example, a data word with bit 35 equal to a 0 and bits 00 through 15 equal to 1 will set execute interrupt cells 00 through 15. A data word with bit 35 equal to a 1 and bits 00 through 15 equal to 1 will set execute interrupt cells 16 through 31.

To read the execute cells, normally referred to as executing an interrupt cell, the active module must be designated as a control module by having one of the mask registers assigned to the module, initiate a system controller cycle with an interrupt pulse $INT, provide an address field that will select the lower addressable store unit, and set the command lines with another specific code. The system controller will respond with a data field that contains the address in bits 12 through 17 of the highest priority unmasked interrupt cell.

The system controller according to the present invention includes four unique execute interrupt mask registers and one port mask register. The purpose of the four execute interrupt mask registers is to allow up to four control processors in the data processing system and thereby permit more than one processor to answer execute interrupts.

Figure 3:
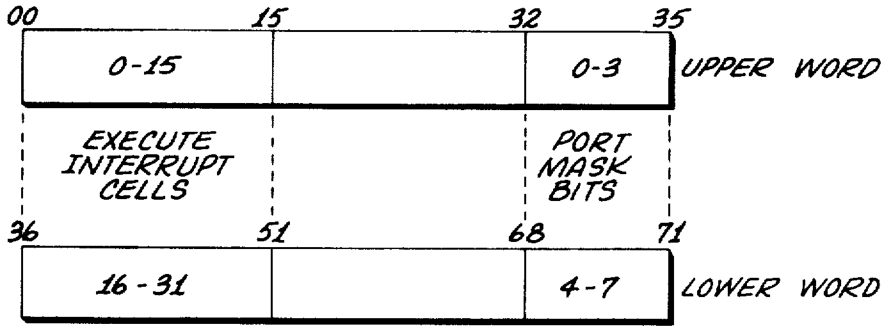
FIG. 3 is an illustration of the data field of a word stored in a mask register according to the present invention.

Each execute interrupt mask register includes one bit for each of the 32 execute interrupt cells. The one port mask register includes one bit for each of the eight active ports which is the maximum number of active ports which is included in the system controller of the present invention. The data field for setting or reading a mask register is shown in FIG. 3. When a mask bit is set in the register, the execute interrupt cell or port corresponding to that bit will be "masked" out, that is, disabled, for the active port assigned that particular mask register. The port mask bits in the register may be overridden by port enable switches on the system controller configuration panel. For the explanation of the execute interrupt cells and the mask registers of the present invention it will be assumed that the port mask bits in the mask registers are not overridden by the port enable switch.

Referring now to FIG. 3, the execute interrupt cells 0–15 comprise bits 00–15 of the upper word and execute interrupt cells 16–31 comprise bits 36–51 of the lower word. The eight port mask bits for the eight ports of the system controller comprise bits 32–35 of the upper word for port mask bits 0–3 and bits 68–71 of the lower word for port mask bits 4–7. The execute interrupt mask registers will in effect direct the execute interrupt cell intermodule communication to the proper port and only to the proper port. To accomplish this direction function, there is a separate 32 level priority network associated with each of the four execute mask registers. The priority networks will allow the system controller to examine the execute interrupt cell priority on a control port basis and thus allow a port attempting to execute a cell to receive only the highest priority unmasked cell assigned to that port.

The mask registers may be read by any port whether it has a mask register assigned to it or not. A control port can set any of the four mask registers.

The logic and timing diagrams for use in the execute interrupt cells and mask register logic of FIG. 2 is shown in FIGS. 4–13. The data that sets the interrupt cells register and the mask registers is carried by the ZCI bus via the data transfer in logic 38. The timing and control signals are generated by the timing and control logic 32 to the logic 40 which comprises the interrupt cells register and the mask register shown on FIG. 2.

Before beginning with a detailed description of the processor portion of the electronic data processing system of the present invention, it is believed that a few words are appropriate concerning the manner in which this portion or unit will be described. It is to be expressly understood that in the description which follows, much of the control circuitry has been omitted for the purposes of brevity and clarity but that these additional circuits would obviously be present in a complete system. However, inasmuch as the generation, use and interrelationship of a large number of these control signals does not, per se, form a part of the present invention and inasmuch as the omission of these factors does not detract from a thorough understanding of the present invention, they are not here included. Additionally, it is to be understood that, while many single lines are shown interconnecting the various switches, registers and other components of the system, these lines in many cases represent a bus having multiple conductors. The number of conductors in any bus will, of course, vary in accordance with the dictates of the individual situation.

Figure 4:
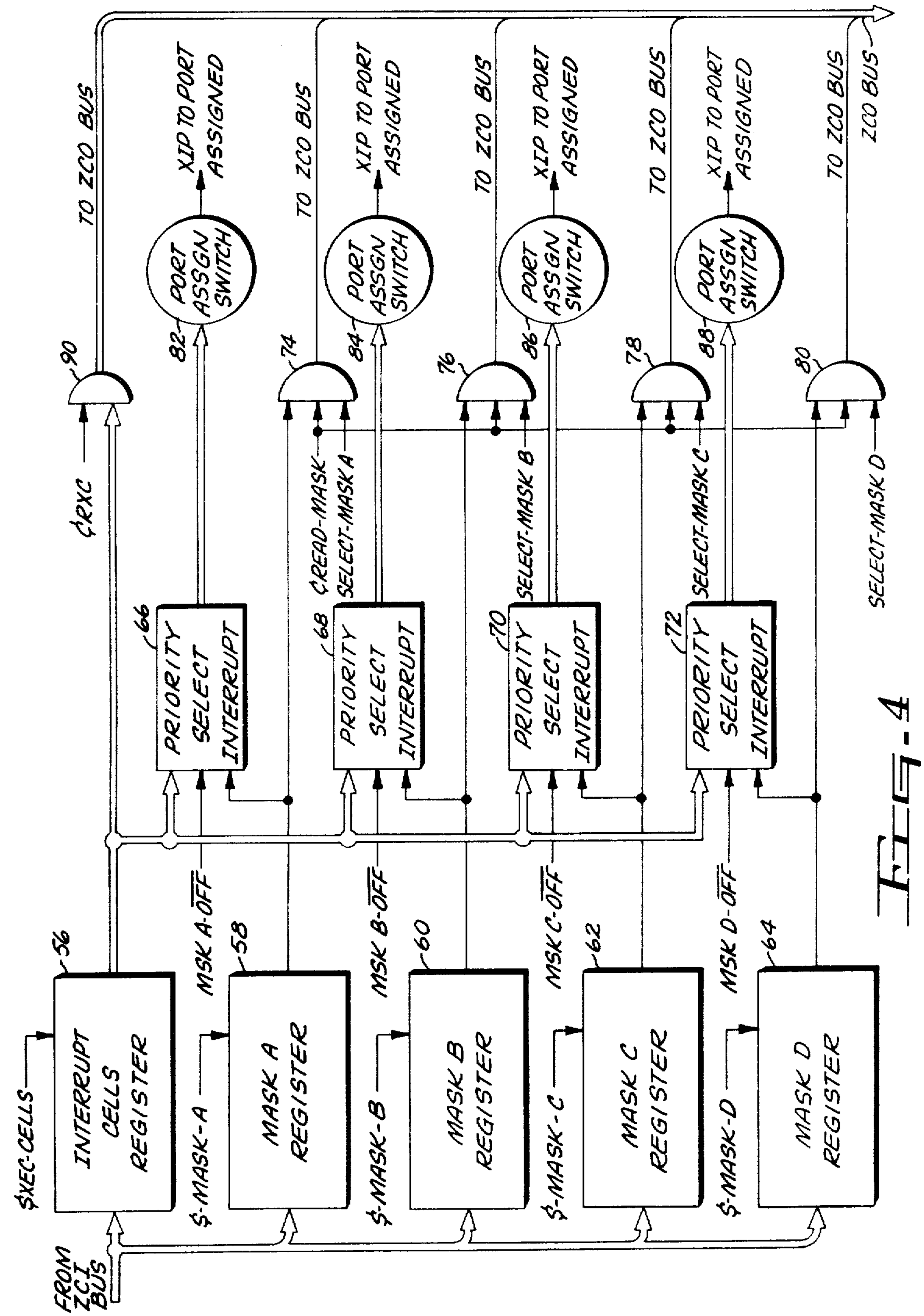
FIG. 4 is a block diagram of an interrupt priority tree used in association with the mask registers.

Referring now to FIG. 4, an interrupt cells register 56 and four mask registers 58, 60, 62 and 64 called mask register A, B, C and D are illustrated along with associated logic to provide the input and output of the data and control signals for the interrupt. The logic diagrams of FIG. 4 represent in block form the execute interrupt cells and mask registers 40 of FIG. 2. The input data comes from the ZCI bus and the output data is placed on the ZCO bus. The control signals are directed to the circuits of FIG. 4 via the XEC lines from the timing and control logic 32, see FIG. 2.

Associated with each mask register A–D is an interrupt priority tree comprising priority select interrupt logic circuitry 66, 68, 70 and 72, output AND-gates 74, 76, 78 and 80, and port assignment switches A–D 82, 84, 86 and 88 respectively. Each interrupt priority tree is disabled when the port assignment switch is assigned to the OFF position. The output of each bit position of the 32 bit interrupt register shown as interrupt cells register 56 is ANDED in output gate 90 with the corresponding bit position of each of the four mask registers. Only one output gate 90 is shown for a bus from the interrupt cells register 56. It is obvious that in the interrupt priority tree, there is a logic gate for each bit position of the interrupt cells register. The interrupt cells register 56 and mask registers A–D receive data from the core input bus ZCI. The interrupt cells register 56 is set when the system controller timing and control logic generates a set interrupt cells register $XEC-CELLS signal and a mask register is set when one of a set mask register $-MASK-A, B, C, or D signal is generated by the executive program and sent to the system controller.

Data flow to the interrupt cells register 56 and to the mask registers A–D is over the core input ZCI bus. As stated previously and shown in FIG. 3, bits 00–15 of the core input ZCI bus provide the path for setting interrupt cells 00–15 and interrupt cells 16–31 receive data from the core input ZCI bus bit positions 36–51. Mask register bits 0–3 receive data from the core input ZCI bus bit positions 32–35 and mask register bits 4–7 receive data information from the core ZCI bus bit positions 58–71. Data flow from the interrupt cells and mask registers for reading and displaying is over the core output ZCO bus.

The contents of the interrupt cells register 56 are gated onto the core output ZCO bus via output gate 90 when the timing and control logic 32 generates the read interrupt cell ¢RXC signal. The ¢RXC signal is generated by the timing and control logic 32 anytime an active module wishes to know the state of the interrupt cells. When an interrupt cell is set, each mask registers priority select AND-gate will generate an interrupt signal provided its port assignment switch is assigned to any position other than off and the corresponding mask bit is set. The interrupt signal XIP is routed to the designated port by the position of the port assignment switch.

When a control processor is notified via the XIP signal from the designated port that there is an execute interrupt cell enabled in the system controller, the control processor generally responds with a read interrupt cells $XEC command. The cell number of the current highest priority cell that is set is sent to the processor in the data field along with the XIP signal. This cell number will be utilized by the processor as the address portion of the $XEC command. The two locations fetched from the store unit during the completion of the XEC command by the system controller will contain the vector information necessary to direct the program to the appropriate routine.

The contents of the mask registers are directed to its respective output gate. The contents of the selected mask register such as mask register A 58 is gated onto the core output bus, the ZCO bus, by the output gate AND-gate 74 when the mask register 58 is selected, that is, the select mask A, ¢READ-MASK signals are enabled. The contents of the mask registers are gated onto the ZCO bus when the timing and control logic 32 generates a gate mask register ¢READ-MASK signal at the request of an active module. The ¢ READ-MASK signal is directed to one input leg of each of the output gate AND-gates 74, 76, 78 and 80.

There are four system commands which when received and executed by the system controller can cause either the setting, resetting, or reading of the contents of the interrupt cells. These four system commands are: the Set Interrupt Cells, SXC command, the Set General Registers command addressed to the interrupt cells, the SGRIC command, the Read Interrupt Cells, XEC command, and the Read General Registers command addressed to the interrupt cells, RGRIC command.

Figure 5:
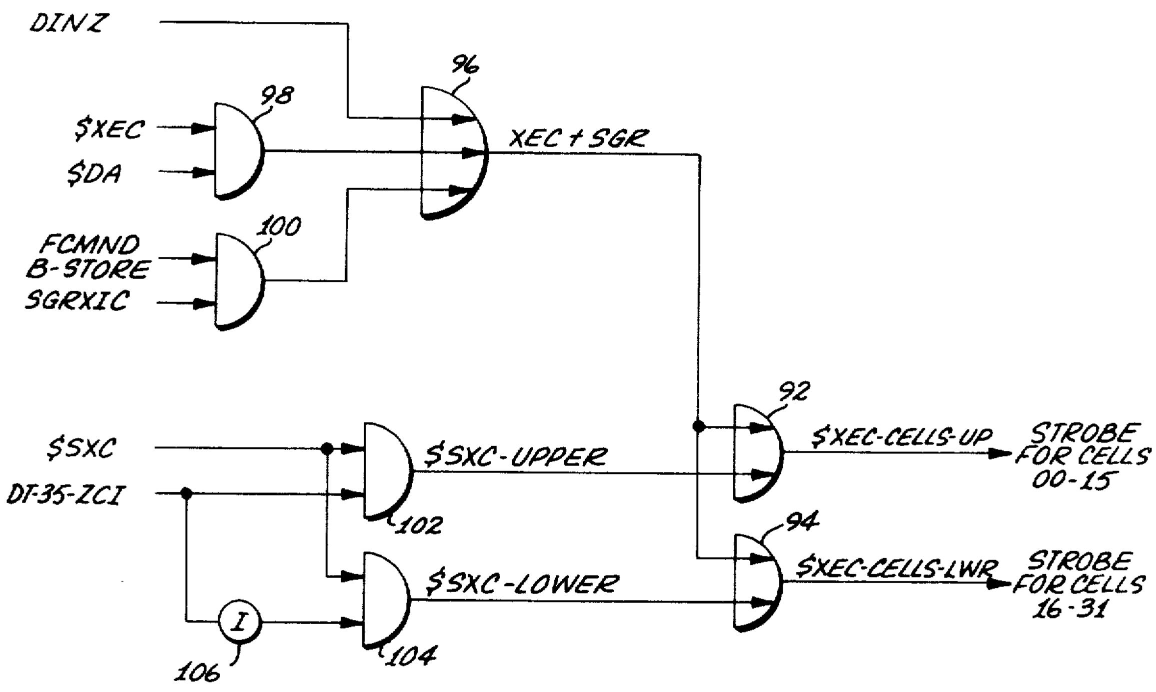
FIG. 5 is a block diagram of a circuit used to scan the interrupt cells.

As shown in FIG. 5, the two signals which set or reset the interrupt cells, the $XEC-CELLS-UP signal which is a strobe or scan signal for cells 00–15, and the $XEC-CELLS-LWR which is the scan signal for cells 16–31, are generated in one of two ways. Two OR-gates 92 and 94 having two inputs on each OR-gate generate the $XEC-CELLS signal. One leg of each OR-gate 92 and 94 is enabled by the read interrupt cells XEC signal or the set general registers command signal SGR obtained from an OR-gate 96. The OR-gate 96 and thus the read interrupt cells $XEC-CELLS signal is activated in three ways via the three inputs to the OR-gate 96. Two AND-gates 98 and 100 are directed to the OR-gate 96.

The $XEC + SGR signal is generated by the AND-gates 98 and 100 and the OR-gate 96 in one of three ways. The system controller initialize DINZ signal activates the read interrupt cells $XEC signal directly via the OR-gate 96 and via the two output OR-gates 92 and 94 directly to the interrupt cells register. The DINZ signal activates the system controller on a start-up or initialize operation. Both upper and lower interrupt cells registers are also activated during a read interrupt cell $XEC signal command from the processor along with the data available pulse $DA signal from the store unit both applied to the AND-gate 98. Thus when both signals are enabled the output of the AND-gate 98 is enabled and, via the OR-gate 96 and the output OR-gates 92 and 94, the read interrupt cells $XEC-CELLS signals are enabled. The $XEC + SGR signal is also generated when the timing and command logic executes a read general registers command addressed to the interrupt cells RGRIC command by enabling a FCMND-B-STORE signal and the set interrupt cells SXC or set general registers command addressed to the interrupt cells SGRIC signal, both of which are applied to the AND-gate 100. The FCMND-B-STORE signal is a command line signal which will be enabled for a read general registers command.

When the timing and control logic executes a set interrupt cells $SXC command, which is applied to one input of two AND-gates 102 and 104, either the $SXC-UPPER or a $SXC-LOWER signal is produced by the AND-gates 102 and 104. Either one of the two AND-gates will be enabled on a set interrupt cell command depending on whether the data bit 35 signal DT-35–ZCI signal is set or reset. If data bit 35 is enabled the AND-gate 102 will be enabled and the $SXC-UPPER signal will be high. The $SXC-UPPER signal is applied to the OR-gate 92 and via the OR-gate 92 enables the $XEC-CELLS-UP signal to strobe the cells 00–15. The data bit enabled is also applied to an inverter 106 whose output will be low thereby disabling the AND-gate 104 and placing the $SXC-LOWER signal in a low or disabled position. Thus data bit 35 signal determines whether the upper or lower interrupt cells will be set depending upon the data received on the ZCI bus (see FIG. 4).

Figure 6:
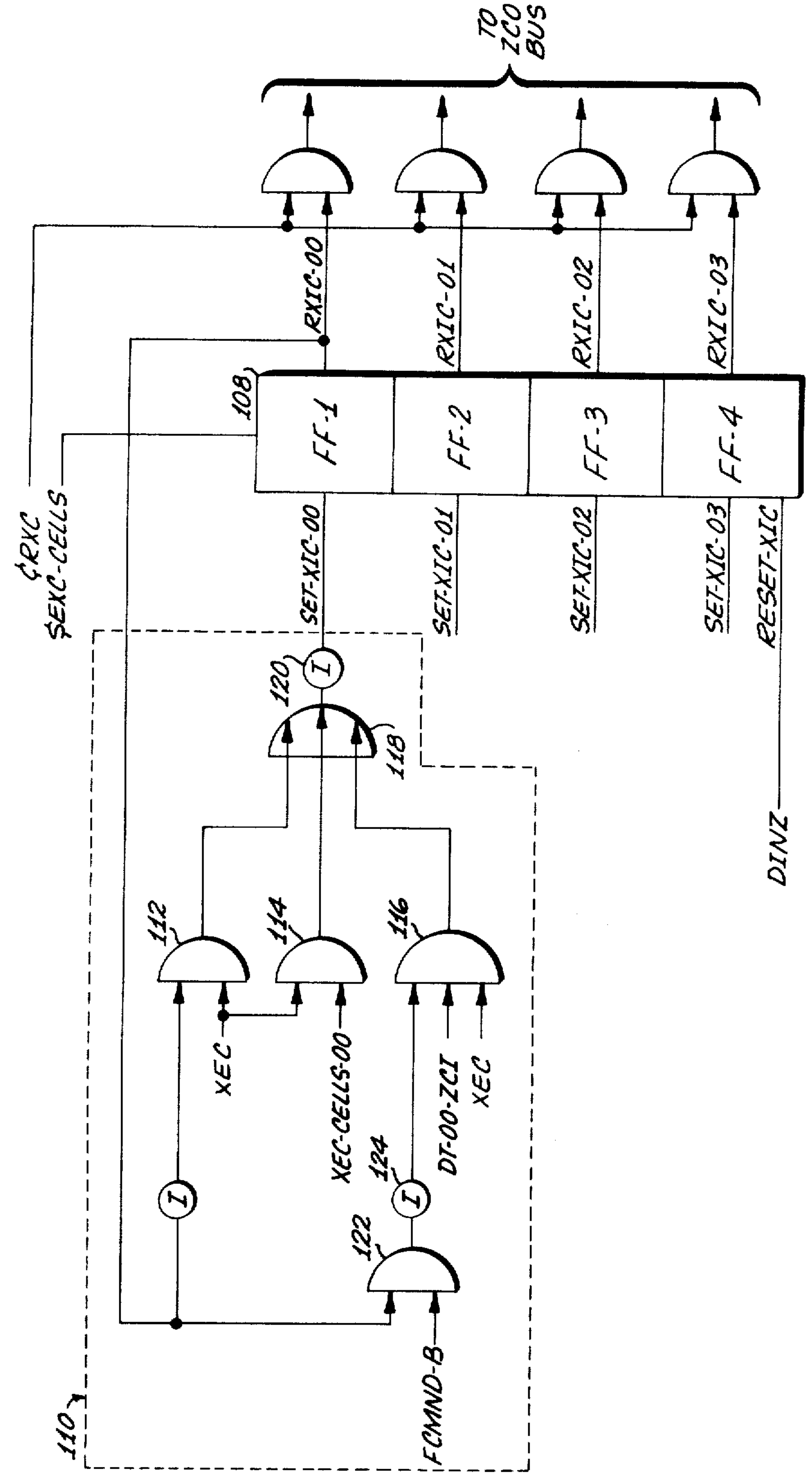
FIG. 6 is a logic diagram of one four-bit stage of the 32 bit interrupt cells register.

The 32 bit interrupt cells register is composed of 8 four bit stages. One stage 108 comprising four flip-flops, FF 1–4, is shown in FIG. 6. The set or enable inputs to the flip-flops are from a logic circuit 110 of which only one for the setting of bit 00 is shown. The logic circuit 110 comprises three AND-gates 112, 114 and 116 whose output are directed to FF 1 via an OR-gate 118. FF 1 of the interrupt cells register generates the bit 00 interrupt cell signal RXIC–00.

Still referring to FIG. 6, the system controller initialize signal DINZ along with the set interrupt cells register $XEC-CELLS signal generated from the initialize signal sets all of the interrupt cells registers to zero. The two AND-gates 112 and 114 each have one input leg controlled by the read interrupt cells XEC command. The other leg of the AND-gate 114 is directed to an XEC-CELLS–00 signal. The XEC-CELLS–00 signal comes from the output of the mask priority tree and associated logic shown in FIG. 5 and when enabled indicates that the interrupt cell register 00 is set and is not masked out by the mask register assigned to the controller port through which this XEC command was received. Thus when the XEC-CELLS–00 signal is enabled and the read interrupt cells XEC signal is received, the AND-gate 114 and the OR-gate 118 will be enabled. An inverter 120 will disable the SET-XIC–00 signal which will cause the cell 00 to reset when the set interrupt cell register $XEC-CELLS signal command occurs. If the XEC-CELLS–00 signal is low, the AND-Gate 114 connected to that signal is disabled and the AND-gate 112 connected to the inverted output of the interrupt cell signal causes the SET-XIC–00 signal to assume the same state as the current value stored in the interrupt cell flip-flop. Thus when the set interrupt cells register command signal $XEC-CELLS occurs, the state of the interrupt cell is unchanged.

The third AND-gate 116 directed to the OR-gate 118 is enabled by the conditions to set the interrupt cell when the set interrupt cell SXC command or a set general registers command addressed to the interrupt cells SGRIC command is executed by the timing and control logic of the system controller. The bit 00 signal, DT–00–ZCI, is the data input containing the bit 00 information for the interrupt cell register from the ZCI input bus. The DT–00–ZCI signal is directed to one leg of the AND-gate 116. The read interrupt cell signal XEC signal is directed to one input of the AND-gate 116 and disables this gate during a read interrupt cell XEC command. For a set interrupt cell SXC command, an AND-gate 122 and an inverter 124 directed to one leg of the AND-gate 116 controls the SET–XIC–00 output signal. The signal FCMND-B is enabled for an SXC command. Thus if the interrupt cell 00 contains a one, the anding with the FCMND-B signal in AND-gate 122 forces SET–XIC–00 to a one by disabling the AND-gate 116 which, via the OR-gate 118 and inverter 120, enables the SET–XIC–00 signal. The enabling of the SET–XIC–00 signal results in no change to the interrupt cell when the $XEC-CELLS signal occurs. If the interrupt cell contains a 0 and therefore the RXIC–00 signal is low, the AND-gate 122 is disabled and therefore has no effect on the output. The control is now by the data bit signal DT–00–XCI. The output of the AND-gate 122 is low and thus the output of the inverter 124 is high thereby enabling one leg of the AND-gate 116. If the data bit signal DT–00–ZCI is enabled, the SET–XIC–00 signal is forced to a high and FF 1 will be set. If the data bit is disabled, the SET–XIC–00 signal is forced to a low and the state of FF 1 will not be effected. Thus the data bit controls the setting of the interrupt cells when a set interrupt cells registers $XEC-CELLS signal is received. The execution of an interrupt cell XEC command can only set an interrupt cell to a one or enabled position. The XEC command cannot reset the interrupt cell to a 0 or disabled position.

Still referring to FIG. 6, for a set general registers command addressed to the interrupt cell, SGRIC signal, the FCMND-B signal is low or disabled which places the output of the inverter 124 and the one leg of the AND-gate 116 in a high or enabled state. This also places control on the data bit DN–00–ZCI signal and the read interrupt cell XEC signal. Therefore an SGRIC command can set an interrupt cell flip-flop. The transfer of the data bit into the interrupt cell register is performed when the set interrupt cells registers signal $XEC-CELLS signal is enabled.

Figure 7:
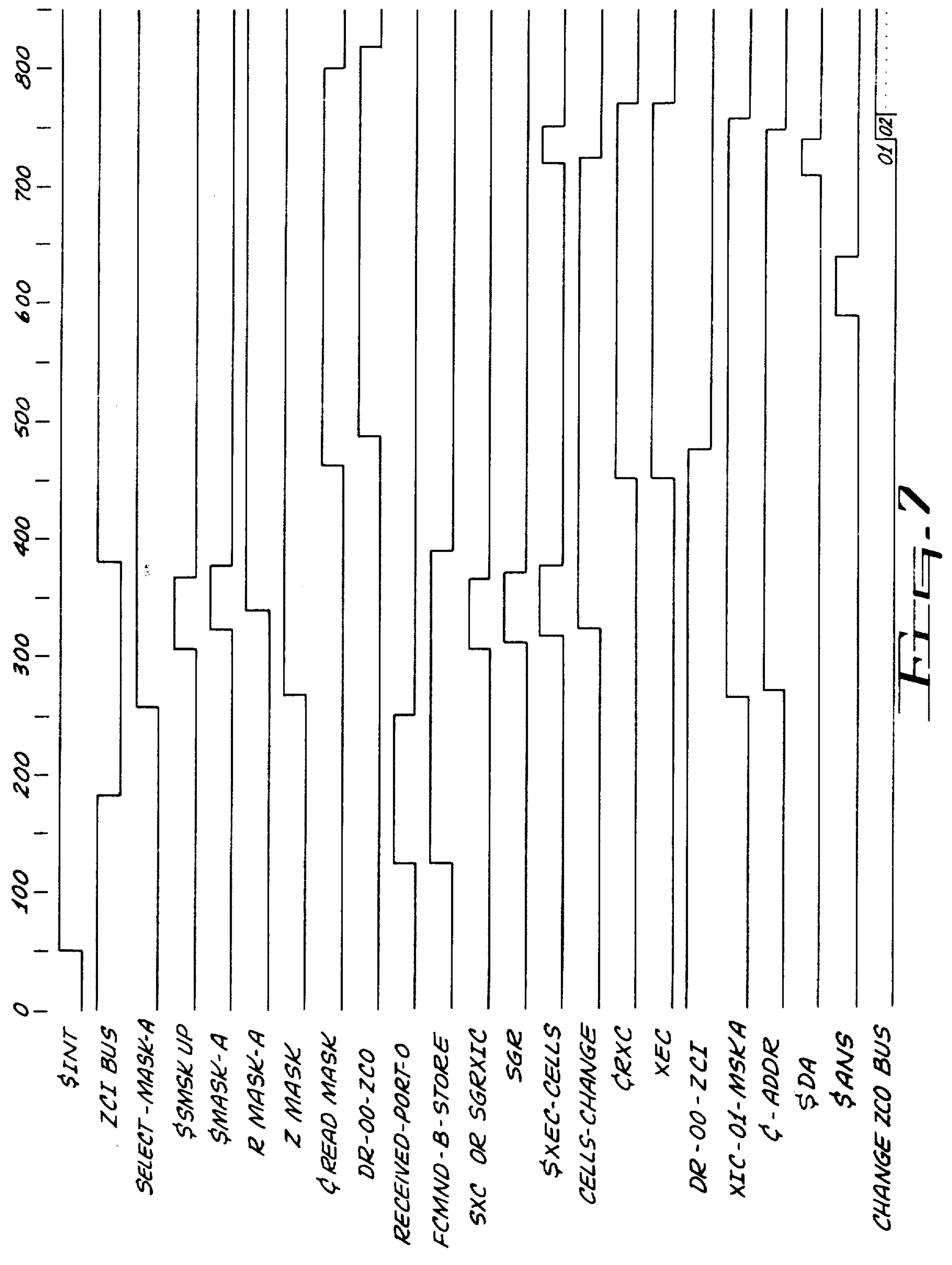
FIG. 7 is a timing diagram of the control signals required for setting and reading the interrupt cells registers and mask registers, and shows the timing of the signals used in and generated by the logic circuits shown in FIGS. 5, 6 and 8–11.

The control signal timing for setting the interrupt cells register is shown in FIG. 7 and is referenced to the time an active module, that is, a processor, input/output controller, and so forth, transmits an interrupt $INT signal and the signal is received by the port interface. If the system controller detects an illegal action or a parity error during the early cycle associated with the command to set the interrupt cells, the contents of the cells are not changed. This is accomplished by inhibiting the generation of the set interrupt cell SXC signal and the set general register command addressed to the interrupt cells SGRXIC signal. The inhibiting is performed in the timing and control logic, see FIG. 2. The control timing associated with the set interrupt cells register XEC command and the read general register command addressed to the interrupt cells RGRXIC command is also shown in FIG. 7. The XEC and the RGRXIC commands are referenced to the late cycle timing. A more detailed description of the XEC command will be given later.

Figure 8:
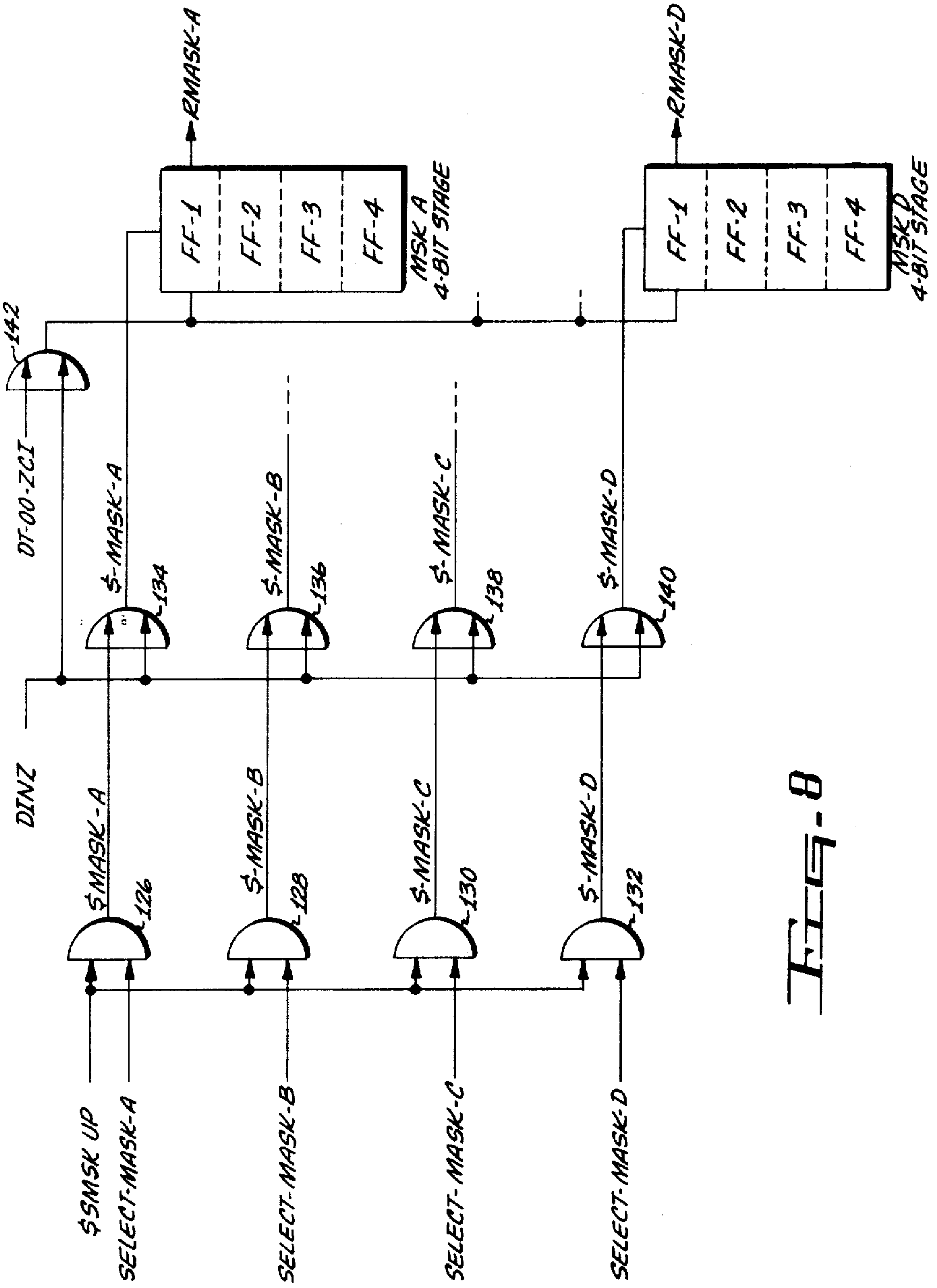
FIG. 8 is a logic diagram showing the control of the setting and resetting of the mask register.

The mask register control signals are shown in FIG. 8. For a mask register to be set or reset by a command from the timing and logic control, the mask register must be assigned to a port. If the mask register is not assigned to a port by the port assignment switch, the mask register will be enabled whenever the controller generates the initialize DINZ signal.

When the controller receives a command to set a mask register, the signals to set the upper mask registers and/or the lower mask registers are generated. For a set mask command SMSK signal along with the address bit 17 being equal to 0, the strobe signal set mask register command upper $SMSKUP is generated. If the address bit 17 is equal to a 1, the set mask register command lower $SMSKLWR signal is generated. When a set general registers command addressed to a mask register SGRXIC signal is generated, both of the set mask strobe signals $SMSKUP and $SMSKLWR are generated.

In FIG. 8 the flip-flops and the associated logic circuitry for the upper mask registers are shown. It is obvious that another similar set of flip-flops and logic circuitry is needed with the lower mask registers. Referring to FIG. 8, the set mask register upper $SMSKUP signal is directed to one leg of each of four input AND-gates, 126, 128, 130 and 132, one AND-gate for each of the mask registers A–D. The other leg of the input AND-gates is directed to the select mask signals associated with each of the mask registers A–D. Thus the SELECT-MASK-A signal is directed to the AND-gate 126 to generate the strobe mask $MASK-A signal. The outputs of each of the input AND-gates 126, 128, 130 and 132 are directed to one input leg of OR-gates 134, 136, 138 and 140, respectively. The outputs of each of the OR-gates 134, 136, 138 and 140 are directed to the flip-flops of the mask registers A–D. A second leg of each of the four OR-gates is connected to the system controller initialize DINZ signal. An OR-gate 142 has its output connected to all of the mask registers. OR-gate 142 gates the upper half of the data information, bits 00–15, of the associated mask register via the bit information DT–00–ZCI signal applied to the input leg of the OR-gate 142. The system controller initialize signal DINZ is also applied to the OR-gate 142 to enable all of the flip-flops of the mask registers on the initializing operation.

The mask registers are therefore set from the system controller initialize system and from the input data lines. When a system controller initialize DINZ signal occurs, all inputs to the mask registers become one via the OR-gate 142 directed to all of the flip-flops of the mask registers and via the OR-gates 134, 136, 138 and 140 which enable all of the $MASK-A to D signals resulting in setting each mask register to all ones.

The set mask register command upper $SMSKUP signal is anded with the SELECT-MASK signal for each mask register. For each SELECT-MASK signal which is high or enabled, the associated mask register is enabled. The data information for the upper half bits 00–15 is transferred into the flip-flops of each enabled mask register setting the enabled mask registers to the data pattern of the DT–00–ZCI bit pattern. Each enabled mask register stores the bit pattern depending upon the bit information signal. One of the SELECT-MASK signals will be generated when the system controller has received a command which uses a mask register. The SELECT-MASK signal identifies the port through which the command was received. Thus if two or more mask registers are assigned to the same port, the corresponding two or more SELECT-MASK signals will become enabled and the corresponding mask registers will each have the data information for the mask registers stored therein.

Setting a mask register occurs during the system controller's early cycle. FIG. 7 shows the control timing referenced to an interrupt $INT signal for the operation where mask register A is assigned to port 0 and a set mask command SMSK signal is received from port 0. With the decoding of the command, the system controller generates a read mask port 0 signal which is anded with the port mask assignment switch producing the SELECT-MASK-A signal. As the early cycle progresses as shown in FIG. 7, the controller generates a set mask register command upper and/or set mask register command lower $SMSKUP or SMSKLWR signal which is anded with the SELECT-MASK-A signal to produce the scan mask register A $MASK-A signal. The leading edge of the $MASK-A signal allows the mask register A bit one to change depending upon the bit information signal DT-00-ZCI coming from the ZCI bus. The falling edge of the $MASK-A signal locks the mask register data into the selected mask register. The detection of a parity error or an illegal action by the system controller during the early cycle of a set mask command will inhibit the generation of the set mask register command upper or lower signal resulting in no change to the mask register. The corresponding bit position outputs of the mask registers are anded with their associated SELECT-MASK signals and then combined to produce the output signal to the core output ZCO bus.

Figure 9:
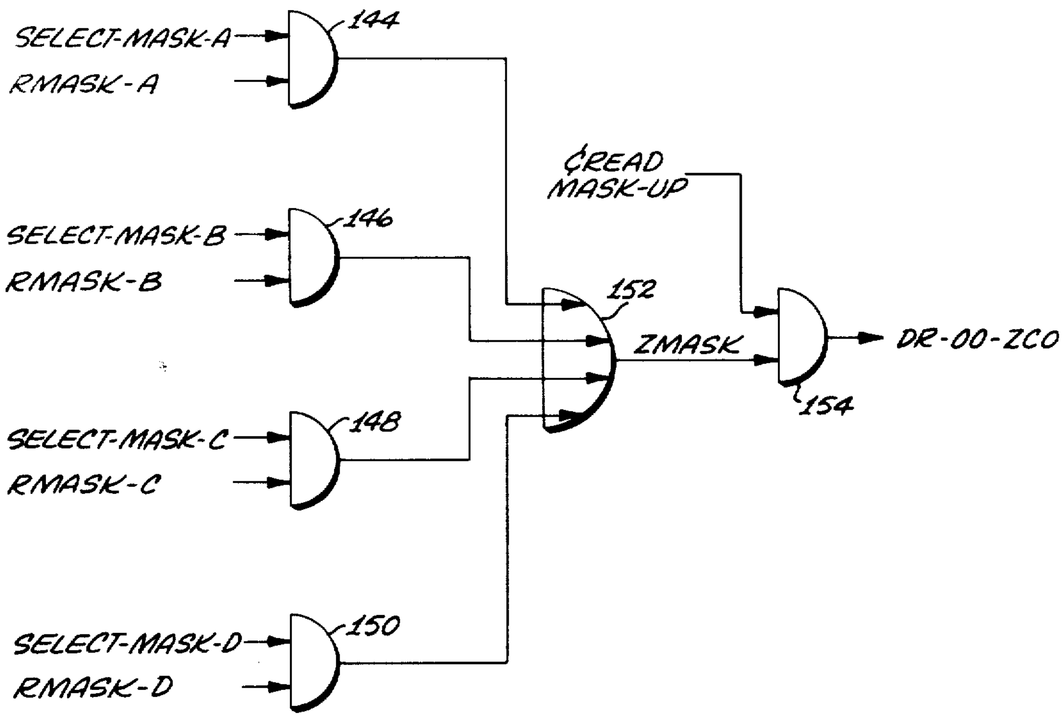
FIG. 9 is a logic diagram showing the logic circuitry involved in reading one mask register of the upper location.

Referring now to FIG. 9, the distribution of the mask registers A–D output signals for the upper location is shown. The mask register outputs RMASK-A to D are directed to four AND-gates, 144, 146, 148 and 150, respectively. The SELECT-MASK-A to D signal is directed to a second leg of the respective AND-gates. The outputs of the four AND-gates 144, 146, 148 and 150 are combined in an OR-gate 152 to produce on the output of the OR-gate 152 the enable signal ZMASK. The ZMASK signal is directed to an input leg of an AND-gate 154. Another leg of the AND-gate 154 is controlled by the gate control signal ¢ READ-MASK-UP signal. The ¢ READ-MASK signal gates the contents of the mask register to the ZCO bus which is represented by the gating of the bit 00 signal DR-00-ZCO to the ZCO bus. The timing of the reading of the mask register is shown in FIG. 7.

Referring now to FIG. 7, the SELECT-MASK signal is generated during the system controller's early cycle timing. The ZMASK enable signal is generated shortly thereafter via the OR-gate 152 (see FIG. 9). The actual transfer of the contents of the mask register is transferred to the ZCO bus later in the cycle as shown in FIG. 7. The actual transfer of the mask register data is performed when the READ-MASK signal gates the contents of the mask register to the ZCO bus via the AND-gate 154 of FIG. 9.

The highest priority interrupt cell which is enabled and not masked is selected by a mask register priority logic. The priority logic for each mask register is contiguous across the 32 cells comprising each mask register. When the highest priority cell required is selected, a downward inhibit function is performed on all other cell selects. If a higher priority cell should be set and selected before this one is served, the higher priority cell will inhibit the lower priority cell. The logic for the selection of the masking priority and the generation of the interrupt is shown in FIG. 10.

Figure 10:
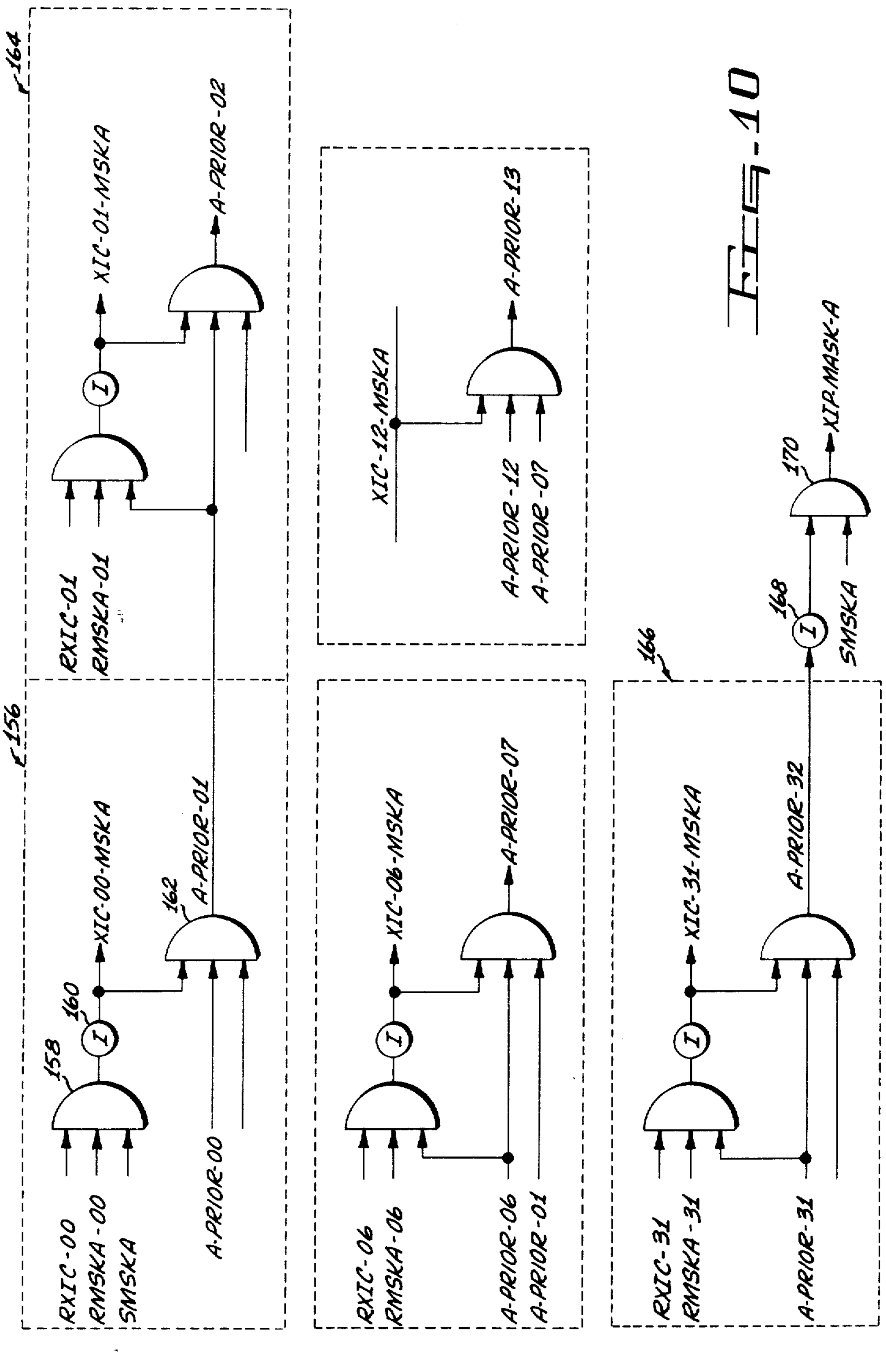
FIG. 10 is a logic diagram of the mask register priority logic and the generation of an interrupt.

Referring now to FIG. 10, a priority tree for mask register A is shown. For the operation to be described it must be assumed that the interrupt cell 00 is enabled and is not masked. On FIG. 10 only some of the priority circuits are shown. Each priority circuit comprises two AND-gates and an inverter. For example, a priority circuit 156 for generating the A-PRIOR-01 signal comprises an inhibit circuit, an AND-gate 158 and an inhibit inverter 160, and an output AND-gate 162. Only selected priority circuits are shown in order to illustrate the connection of the logic circuits. Thus as a general wiring rule, the priority circuits from 00 through 06 are connected similarly as the priority circuit 156 for priority-01 and a priority circuit 164 for priority-02. Each priority circuit has an output of the prior priority circuit wired into its output AND-gate along with an output signal from an inhibit circuit designated as an XIC-XX-MSKA signal where the XX refers to the number of the priority circuit.

For priority gates 07 through 12 one leg of the output AND-gates is controlled by the A-PRIOR-01 signal along with the signal from the output gate of the prior priority gate and the output signal XIC-XX-MSKA of the inhibit circuit. The priority circuits for interrupt cells 13 through 18 are similarly wired except that one leg of the output AND-gate is connected to the A-PRIOR-07 signal. The interrupt priority cells 19 through 24 are similarly wired as the others with the difference being that the A-PRIOR-13 signal is directed to one leg of the output AND-gate of each of these priority circuits. Again for the interrupt cells 25 through 31, the priority interrupt cells logic circuit is similar except that one leg of the output AND-gate is controlled by the A-PRIOR-24 signal. The priority interrupt cell 32 logic circuitry is illustrated in a separate block 166 and the A-PRIOR-32 signal is directed to an inverter 168 whose output is combined in an AND-gate 170 with the set mask register SMSKA signal to enable the interrupt present signal XIP-MASK-A. The interrupt present signal XIP-MASK-A signifies to the system controller and ultimately to the processor that an interrupt is required.

Referring now specifically to the priority circuits of FIG. 10, and assuming that the priority tree for mask register A is enabled and that interrupt cell 00 is enabled and is not to be masked. The set mask register A signal SMSKA from the control panel is high or enabled because mask A is assigned to an active port. The interrupt cell 00 is high and therefore the RX-IC-00 signal from the output of the cell is enabled. The output of the inhibit circuit inverter 160 in the priority 01 circuit XIC-00-MSKA signal goes low, thereby disabling the output AND-gate 162 in the priority-01 logic circuitry. The disabling of the XIC-00-MSKA signal triggers the inhibit propagation down the priority tree. As the output of output AND-gate 162, signal A-PRIOR-01, goes low it will continue to propagate through to the output AND-gate for the priority cell 02. The A-PRIOR-02 signal goes low and continues to propagate to the next priority interrupt cell logic and passes down in turn until the A-PRIOR-06 circuitry is disabled.

At the same time since the A-PRIOR-01 signal is also directed to the priority interrupt cell 07 logic circuitry, the A-PRIOR-01 signal disables the output AND-gate of priority-07 circuit and causes another propagation of inhibits down through the priority interrupt cells 07 through 12. The A-PRIOR-07 signal is directed to the output AND-gates of the priority interrupt cell 13 logic circuitry to cause the propagation of the inhibit through the priority interrupt cells 13 through 18. Thus the inhibit is propagated both in series and in parallel until the priority interrupt cell 32 logic circuitry 166 is disabled by the A-PRIOR-31 signal. The A-PRIOR-31 signal causes the output AND-gate of priority interrupt cell 32 logic circuitry to be disabled. The disabled A-PRIOR-32 signal is inverted by an inverter 168 to produce a high or enabling signal at the output of the inverter 168. The output of inverter 168 is applied to an input leg of the AND-gate 170. The inverter 168 output along with the set mask register-A SMSKA signal enables the AND-gate 170 and causes the program interrupt present signal for mask A, XIP-MASK-A signal, to be generated.

Therefore, as is illustrated in FIG. 10, the setting of the priority interrupt cell in any place in the priority logic for the particular mask register causes all of the cells of a lower priority to be disabled thereby preventing any lower priority interrupt from being serviced via the processor connected to the mask A port. The setting of an unmasked priority interrupt cell generates an interrupt present signal to signal the presence of the interrupt to the processor. If the interrupt cell contains a program of a lower priority than the program being serviced by the processor, the mask register assigned to the processor will prevent the servicing by preventing the propagation of the inhibits through the priority tree.

An example of the operation of the masking of an interrupt is as follows: Assume that all priority interrupts 05 and above in rating are to be serviced by the processor A connected to mask register A and all interrupts 06 and below are not to be serviced. The supervisory program sets the mask register A to 05 meaning that the mask register A output signals RM- SKA–00 to RMSKA–05 are enabled (not masked) and RMSKA–06 through RMSKA–31 are disabled (masked), see FIG. 8. Assume further for the first case that an interrupt signal having a priority rating signal set of 01 is requested and has been transmitted and stored in the interrupt cells register A thereby enabling the RXIC–01 signal serviced by control processor A. Referring to FIG. 10 for the priority servicing, the RXIC–00 signal applied to AND-gate 158 is low thereby enabling the XIC–00–MSKA signal. When the priority check of the first or 00 interrupt circuit is checked at the enabling of the SMSKA signal, the A-PRIOR–00 signal is enabled and therefore the A-PRIOR–01 signal is high or enabled via the AND-gate 162. However in priority circuit 164, the RXIC–01 signal is high since the interrupt request being serviced has an 01 rating, the RMSKA–01 signal is high since an 01 rating is not to be masked, and the concurrent occurrence of the high A-PRIOR–01 signal on the input AND-gate, disables the XIC–01–MSKA signal at the output of the inverter. The inhibit signal is thereby propagated through the priority tree enabling the XIP-MASK-A signal to allow the interrupt request. An identification signal having an address of the store unit is also included in an interrupt signal from a communicating device requesting an interrupt. The address depends upon the type of interrupt requested and is stored in the system controller for transmit to the control processor along with the interrupt present signal.

For a second case, assume the same conditions with an interrupt request of an 06 priority rating signal set being received for servicing. The priority circuit 156 will again produce an enabled A-PRIOR–01 signal. The priority circuit 164 will produce an enabled A-PRIOR–02 signal since the priority rating signal set, the RXIC–01 signal, is low and therefore the XIC–01–MSKA signal is enabled. This will continue, each output of the priority circuits being enabled by the low interrupt signal. In the 06 priority circuit, the RXIC–06 signal is enabled but this level of priority is to be masked and thus the RMSKA–06 signal is low thereby again enabling the priority circuit output signal XIC–06–MSKA. Since all other mask register signals above 06 are masked or disabled, the same outcome will appear on all other priority circuits and the interrupt present XIP-MASK-A signal will be disabled preventing the interrupt of the processor A.

It is obvious that since all active modules have access to all of the interrupt cells registers, an active module may be denied access to processor A, for instance if processor A is servicing a higher priority program. But the active module may request service of control processor B by setting the interrupt cells register for mask register B (set to processor B). Processor B might be performing a low priority program and could therefore be interrupted by the active module and serviced ahead of the low priority program. By the setting or resetting of its associated mask register, a control processor can mask or inhibit all interrupt requests by resetting all of the flip-flops comprising its mask register, or can service all requests by setting all of the flip-flops, or can service priority requests anywhere in between.

By the multiple mask registers of the present invention, better servicing of priority programs is allowed by designating several processors in a multiprocessor system as control processors. No processors need be dedicated to servicing selected modules but, by the combination of system communication controllers and multiple mask registers, all processors can be made extremely versatile by servicing all other active modules, even other processors.

Figure 11:
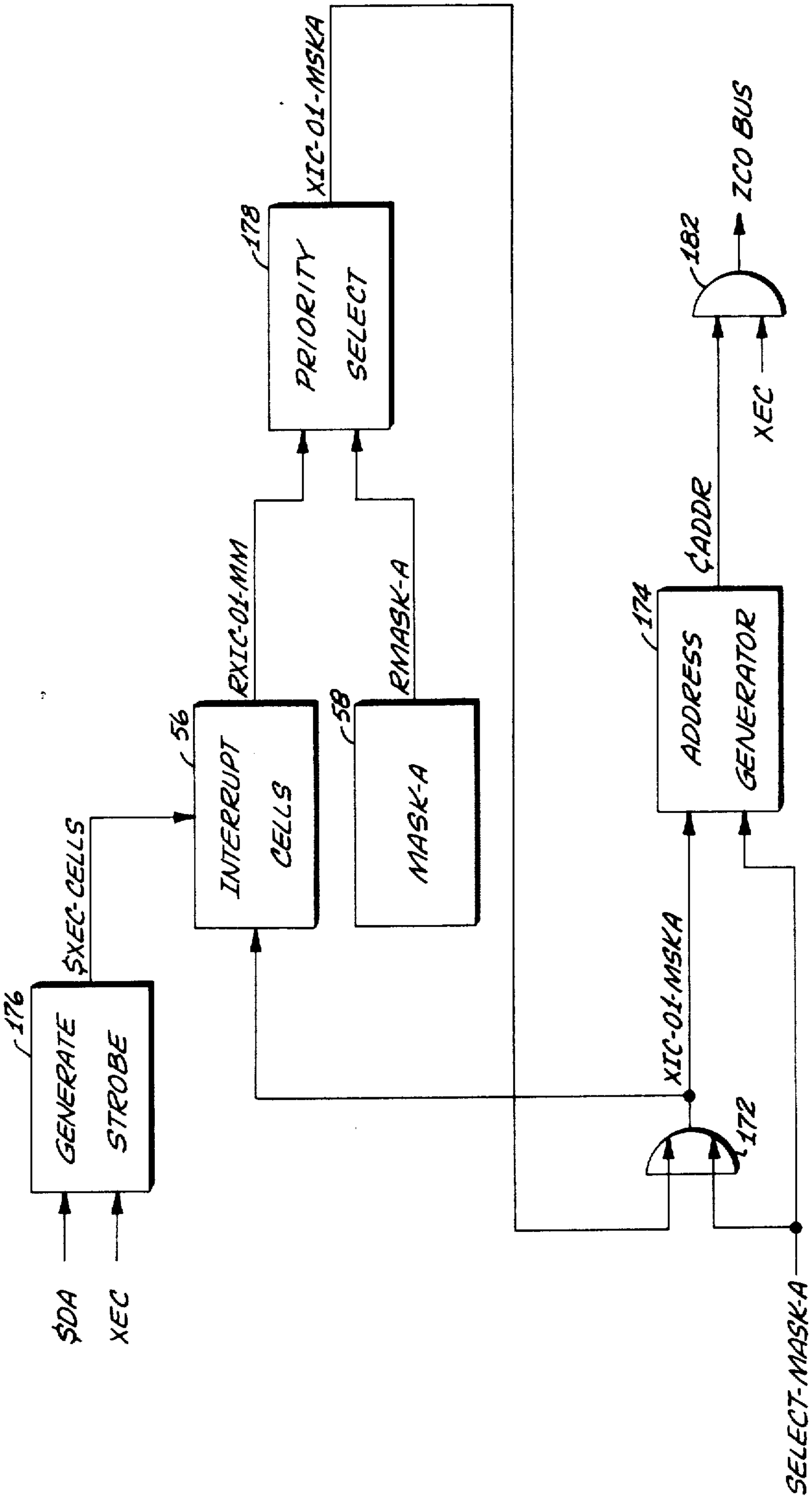
FIG. 11 is a logic diagram showing the general control signal flow for the read interrupt cell signal and the generation of a partial address for transmission to the control processor.

The general control signal flow for the interrupt cells XEC command signal is shown in FIG. 11. The associated timing for the set interrupt cell XEC command signal is shown in FIG. 7. The timing involves both the system controller early and late cycles. The early cycle is referenced to the interrupt INT signal and the late cycle is referenced to the strobe answer pulse $ANS signal.

During the early cycle, the system controller generates the mask signal shown as RMASK-A signal via the MASK A register 58. The RMASK-A signal through a priority selector 178 causes the inhibit cell signals from the interrupt cell register 56 shown as the XIC–01–MSKA signal to be enabled. The inhibit cell signal is directed via the OR-gate 172 to an address generator 174 which in turn causes an address signal ¢ ADDR signal to become enabled.

The interrupt signal from any one of the communicating devices, the input/output controller 18 (see FIG. 1), the communication processor 20, or any of the processors 10 and 11, includes a priority rating signal set and an identification signal. The priority rating signal set is stored in the interrupt cells register 56 (see FIG. 4 and FIG. 11). The identification signal is representative of the predetermined condition causing the generation of the interrupt. The information contained in the identification signal activates the address generator 174, FIG. 11, to generate an address which when transmitted to the store unit will extract from the store unit, a word that includes the vector designation of the program requiring servicing according to the predetermined conditions.

When the late cycle begins, the system controller generates the set interrupt cell $XEC-CELLS signal by activating the generate strobe circuitry 176 via the strobe answer $ANS signal from the memory units and the read interrupt cells signal XEC from the module requesting an interrupt both directed to the generate strobe circuitry 176. The generation of the read interrupt cells XEC signal also gates the address bits from the address generator 174 onto the core output ZCO bus by activating an output AND-gate 182. The data is then gated from the ZCO bus to the module. While the data is being transferred to the communicating device module, the set interrupt cells $XEC-CELLS signal causes the resetting of the interrupt cells. The scanning is completed before the data on the ZCO bus changes and the interrupt cells are reset and locked before the inputs to the interrupt cells can change.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, with the limits only of the true spirit and scope of the invention.

What is claimed is:

1. A data processing system comprising:

a memory store for storing data and program instructions at addressable locations;

a plurality of communicating devices including a plurality of data processors and control data processors for manipulating data in accordance with the program instructions retrieved from said memory store, said communicating devices including means for generating interrupt signals in response to predetermined conditions, said control data processors each including means for generating mask signals identifying the priority of the program instructions being used by the control data processor to manipulate data, and each including means for interrupting the manipulations; and a system controller connected to said memory store and to said communicating devices responsive to the generation of said interrupt signals for providing an address to said control data processor, said address including a bit configuration unique to the conditions giving rise to the generation of the interrupt signals, said system controller also responsive to the generation of said interrupt signals for providing an interrupt present signal to interrupt the manipulations of said control data processor, said system controller including a plurality of means responsive to said mask signals one means associated with each control data processor for inhibiting the generation of said interrupt present signal and the presentation of said address to its associated control data processor according to the priority of the program instruction in the mask signal when said interrupt signals are generated in response to selected ones of said predetermined conditions.

2. The data processing system of claim 1 wherein the system controller includes:

a plurality of storage means one associated with each control data processor for storing said interrupt signals when said interrupt signals are generated in response to selected ones of said predetermined conditions and transmitted to said system controller;

a plurality of mask registers one associated with each storage means for storing said mask signals according to the priority of the program instructions when said mask signals are generated by said control data processor and transmitted to said system controller.

3. The data processing system of claim 2 wherein the system controlier also includes a plurality of priority trees each controlled b; an associated one of said plurality of mask registers and each connected to an associated one of said plurality of storage means for generating said interrupt present signals to an associated one of said plurality of control data processors according to the priority of the program instruction in the mask signal.

4. The data processing system of claim 3 wherein said interrupt signals comprise a priority rating signal set identifying the priority of the interrupt signal stored in said storage means and an identification signal signifying an addressable location of a program instruction in said memory store.

5. A data processing system comprising:

a memory store for storing data and program instructions at addressable locations;

a plurality of communicating modules including a plurality of data processors and control data processors for manipulating data in accordance with the program instructions, each of said communicating modules including means for generating interrupt signals in response to predetermined conditions, said control data processors each including means for generating mask signals identifying the priority of the program instructions being used by the control data processor to manipulate data and each including means for interrupting the manipulations; and a system controller connected to said memory store and to said plurality of modules responsive to the generation of said interrupt signals for providing an interrupt present signal to said plurality of control data processors;

said system controller including, a plurality of storage means one associated with each control data processor for storing said interrupt signal when said interrupt signals are generated in response to selected ones of said predetermined conditions and transmitted to said system controller, a plurality of mask registers one associated with each storage means for storing said mask signals according to the priority of the program instruction when said mask signals are generated by said control data processor and transmitted to said system controller; and means controlled by said plurality of mask registers for inhibiting the generation of said interrupt present signal.

6. The data processing system of claim 5 wherein the system controller also includes a plurality of priority trees each controlled by an associated one of said plurality of mask registers and each connected to an associated one of said plurality of storage means for generating said interrupt present signals to an associated one of said plurality of control data processors according to a priority.

7. The data processing system of claim 6 wherein said interrupt signals comprise a priority rating signal set identifying the priority of the interrupt signals for storage in said storage means and an identification signal signifying an addressable location of a program instruction in said memory store for transmission to said control data processor.

8. In a data processing system including a memory store device for storing data and program instructions at addressable locations, a plurality of communicating devices including a plurality of control data processors for manipulating data in accordance with the program instructions and responding to interrupt signals to interrupt the program instructions, said communicating devices including means for generating the interrupt signals in response to predetermined conditions, a system controller connected to said store device and to said communicating devices responsive to the generation of said interrupt signals for providing an interrupt present signal to said control data processors, the improvement to the system controller comprising:

a plurality of storage means one associated with each control data processor for storing said interrupt signals when said interrupt signals are generated in response to selected ones of said predetermined conditions and transmitted to said system controller;

a plurality of mask registers one associated with each storage means for storing a representation of the priority of the program instruction manipulating data in the associated control data processor; and a plurality of priority trees each controlled by an associated one of said plurality of mask registers and each connected to an associated one of said plurality of storage means for generating said interrupt present signals to an associated one of said plurality of control data processors according to a priority.

9. The data processing system of claim 8 wherein said interrupt signals comprise a priority rating signal set identifying the priority of the interrupt signals for storage in said storage means.

10. The data processing system of claim 9 wherein said interrupt signals also comprise an identification signal and wherein said system controller also comprises an address generating means actuated according to the identification signal to generate an address location of a program instruction in said memory store for transmission to said control data processor with said interrupt present signal.

* * * * *